United States Patent
Newton et al.

(10) Patent No.: US 6,860,173 B2
(45) Date of Patent: Mar. 1, 2005

(54) POWER INSTALLATION TOOL FOR HELICAL COIL INSERTS

(75) Inventors: David W. Newton, Bethel, CT (US); William Giannakakos, Danbury, CT (US); William J. Lutkus, Watertown, CT (US); Michael Bardelli, New Milford, CT (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/318,914

(22) Filed: Dec. 13, 2002

(65) Prior Publication Data

US 2004/0112179 A1 Jun. 17, 2004

(51) Int. Cl.⁷ .............................................. B25B 21/00
(52) U.S. Cl. ........................ 81/57.11; 29/240.5; 29/227
(58) Field of Search .......................... 81/440–445, 450, 81/57.11, 57.44; 29/227, 456, 240.5

(56) References Cited

U.S. PATENT DOCUMENTS

| | | | | |
|---|---|---|---|---|
| 2,371,622 A | * | 3/1945 | Hawkins | 29/240.5 |
| 2,855,661 A | * | 10/1958 | Forster | 29/240.5 |
| 4,172,314 A | * | 10/1979 | Berecz et al. | 29/240.5 |
| 4,449,283 A | * | 5/1984 | Berecz et al. | 29/566.1 |
| 4,768,270 A | * | 9/1988 | Czarnowski | 29/240.5 |
| 5,730,035 A | * | 3/1998 | Ohmori et al. | 81/57.44 |
| 6,367,138 B1 | * | 4/2002 | Newton et al. | 29/240.5 |
| 6,470,557 B2 | * | 10/2002 | Newton et al. | 29/456 |

* cited by examiner

*Primary Examiner*—David B. Thomas
(74) *Attorney, Agent, or Firm*—Harness, Dickey & Pierce, P.L.C.

(57) ABSTRACT

A tool for installing a helical coil insert in a tapped hole formed in a workpiece includes a tubular body having a bore extending along its axis, a mandrel coaxially disposed in the bore of the tubular body, a motor for rotating the mandrel, and an air cylinder for applying an axial force to the mandrel. The tubular body includes a recess at one end for carrying a helical coil insert in alignment with the bore. An opening in the tubular body allows a user access to the recess. The tubular body is moveable to position the helical coil into selective engagement with the mandrel, whereby rotation of the mandrel installs the helical coil insert a selected depth in the tapped hole of the workpiece. In addition, the mandrel slides axially within the bore of the tubular body to remove the tang from the helical coil insert upon installation of the helical coil insert in the tapped hole.

33 Claims, 9 Drawing Sheets

POWER INSTALLATION TOOL FOR HELICAL COIL INSERTS

FIELD OF THE INVENTION

The invention relates generally to tools for installing helical coil inserts into tapped holes and, more particularly, to such power installation tools having the ability to break off a tang of the helical coil insert.

BACKGROUND OF THE INVENTION

Helical coil inserts are commonly installed into tapped holes of a workpiece so that threaded fasteners such as screws can be held more securely. These inserts are frequently used to improve the gripping of threaded fasteners made of relatively hard materials, such as various steel alloys, when installed in relatively soft parent materials, such as aluminum. Helical coil inserts typically include a diametrical tang used as a grip by a mandrel of the installation tool for screwing the helical coil insert into the tapped hole.

Helical coil inserts of this kind are usually installed by pre-winding them to reduce their diameter, and then rotatably threading them into a tapped hole. Once installed, the inserts expand from their contracted diameters and press radially outwardly against the walls defining the tapped holes, whereby the insert is securely held in place. Power tools for installing inserts are typically driven by an air motor and include a tubular body having a threaded bore extending along its axis and an opening at one end of the body for placing an insert in the bore. A mandrel is rotated by the motor within the threaded bore into engagement with the insert. Advancement of the mandrel forces the insert through a pre-winder, which reduces the insert's diameter, and from there into a tapped hole in an adjacent workpiece.

Once the insert is installed at the correct depth in the bore of the workpiece, the mandrel is reversed until it is removed from the insert. In many instances, particularly if a through-going hole is lined with an insert, the tang must be removed after installation as otherwise it would interfere with a bolt engaging the insert. To facilitate removal of the tang, a notch is conventionally provided in the wire near the point where the diametrical tang joins the adjacent coil convolution. Thus, after using a conventional power tool to install the insert, the installer uses a second tool to break the tang at the notch.

This two-tool process is time consuming and inefficient, particularly when many bores must be lined with helical coil inserts, such as in a manufacturing setting. Great efficiencies and cost savings would be realized by combining and simplifying the helical coil insert installation and tang removal process.

SUMMARY OF THE INVENTION

A single tool for installing a helical coil insert in a tapped hole formed in a workpiece and removing a tang from a leading coil convolution simplifies the helical coil insert installation process. The power installation tool according to the invention includes a tubular body having a bore extending along its axis. A recess preferably provided at one end of the tubular body carries a helical coil insert in alignment with the bore. An opening in the tubular body allows access to the recess for placing the insert in the recess. A mandrel is coaxially disposed in the bore of the tubular body to engage and rotate the helical coil insert for installation. More specifically, a hook on the leading end of the mandrel engages a tang on the helical coil insert for winding the helical coil insert prior to installation of the coil in the tapped hole of the workpiece. Further, the mandrel serves as a punch, movable to sever the tang from the helical coil insert upon full installation of the insert in the tapped hole of the workpiece. A motor rotates the mandrel to insert the helical coil insert a predetermined distance in the tapped hole. An air cylinder applies an axial force to the mandral to move it from a retracted position to an extended position where it removes the tang.

In one embodiment, the air motor is offset axially from the tubular body and is connected to the mandrel by a gear train, whereby rotation of the motor shaft rotates the mandrel. It is preferred to include a drive sleeve in the tubular body for connecting the gear train to the mandrel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
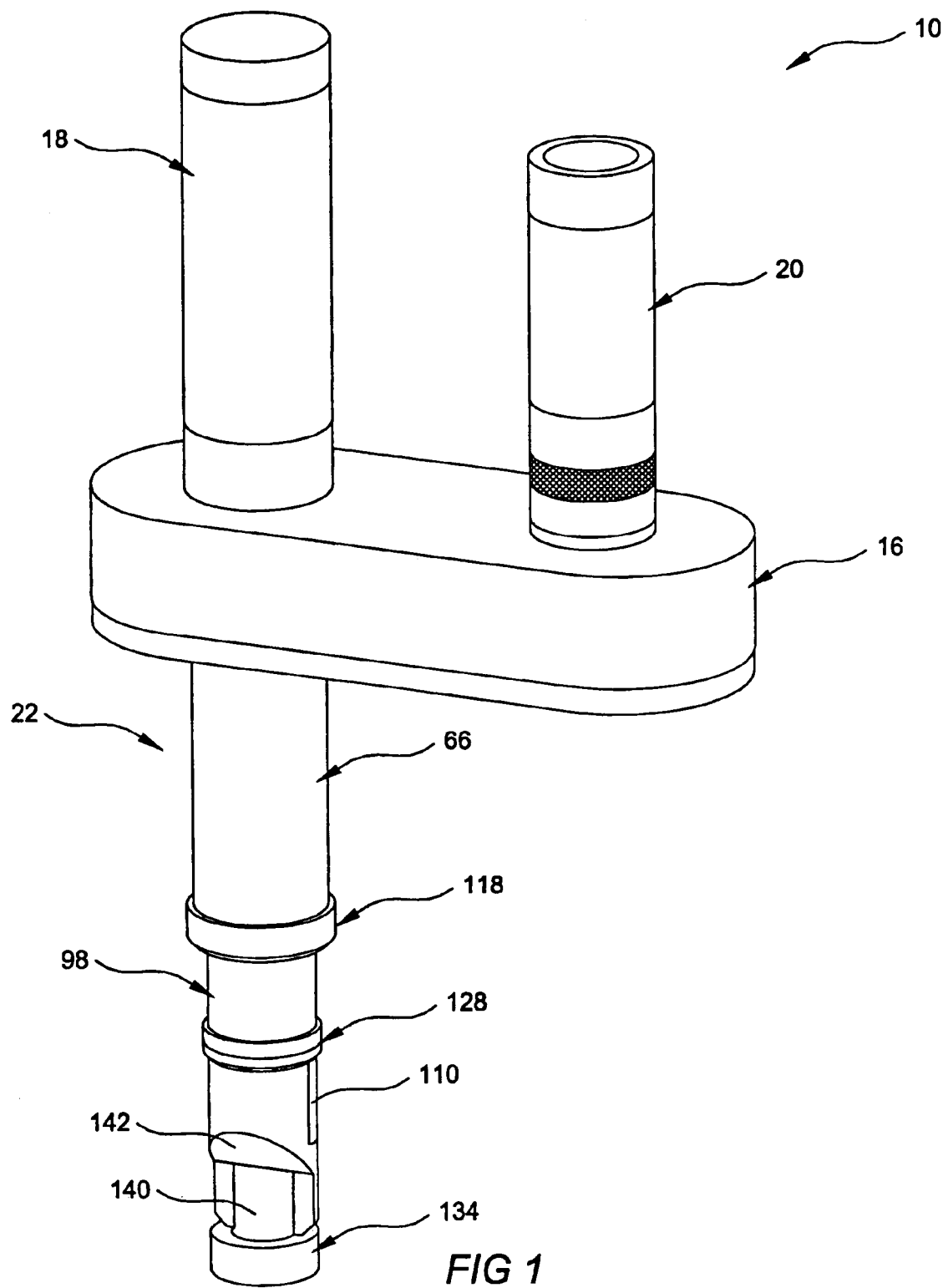
FIG. 1 is a perspective view of the power installation tool according to the invention.
Figure 2:
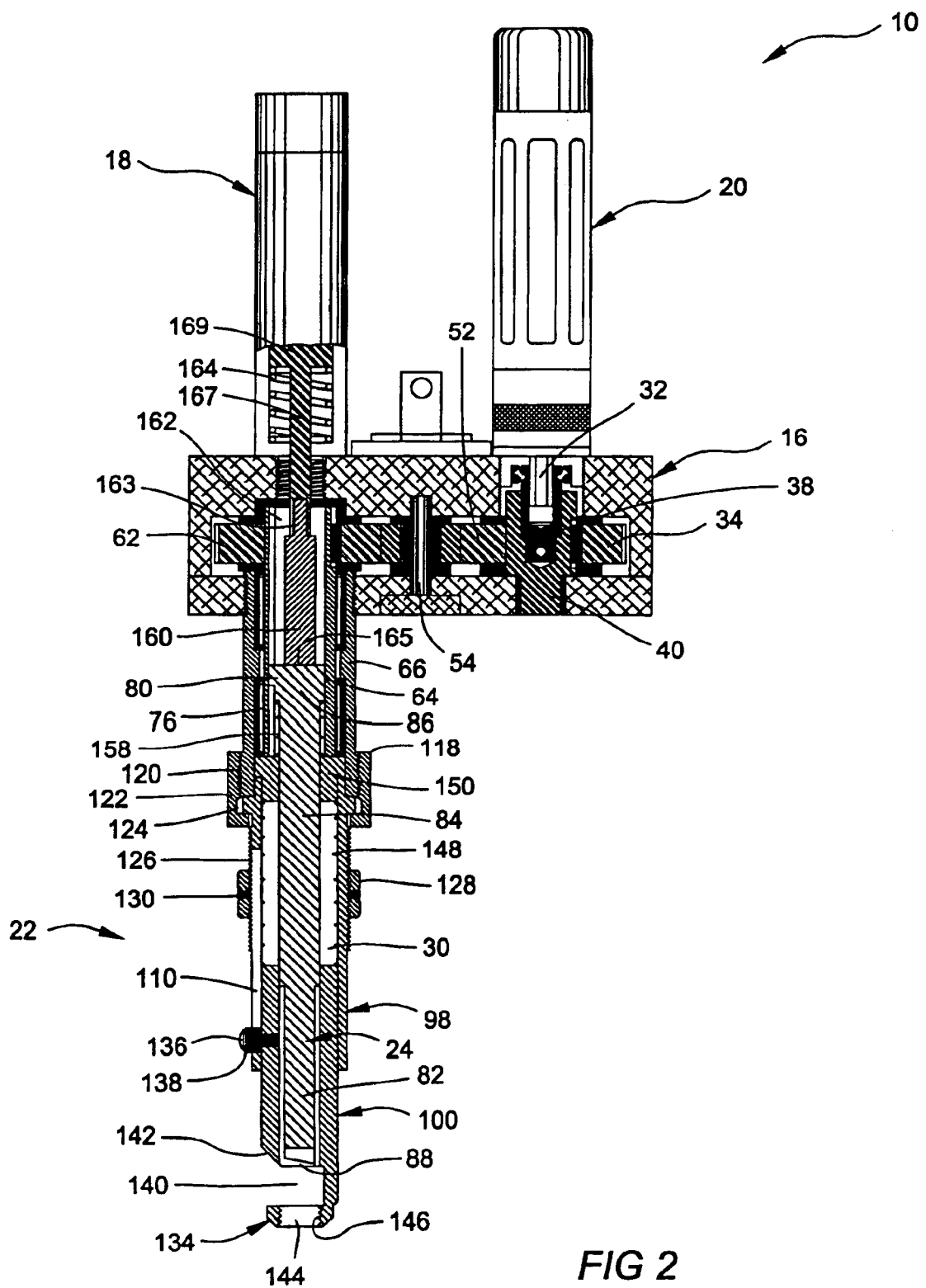
FIG. 2 is a partial sectional view of the power installation tool of FIG. 1.
Figure 3:
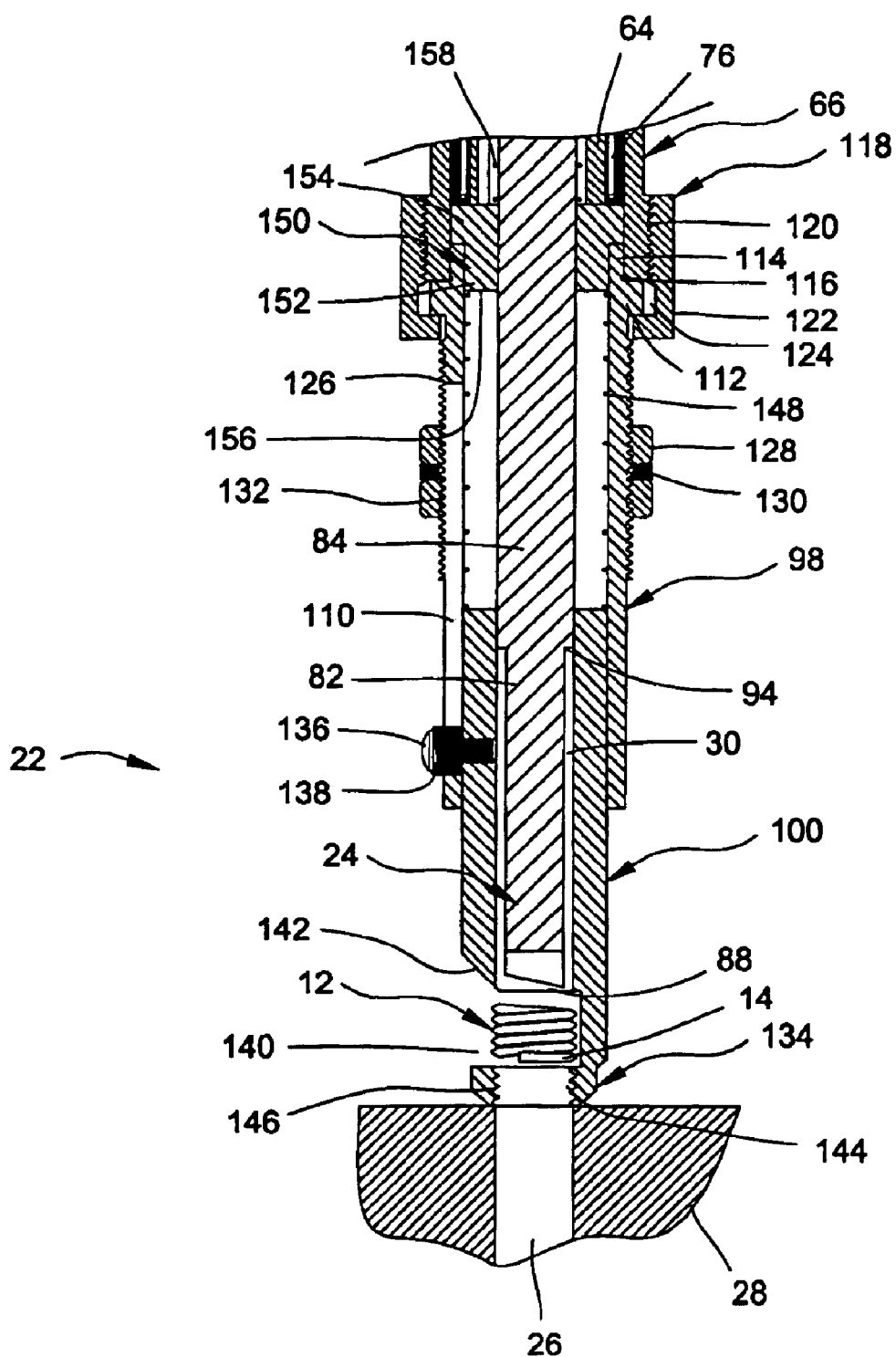
FIG. 3 is a partial sectional view of a helical coil insert carried by a recess in a bore of the power installation tool of FIGS. 1 and 2 prior to installation of the insert.
Figure 4:
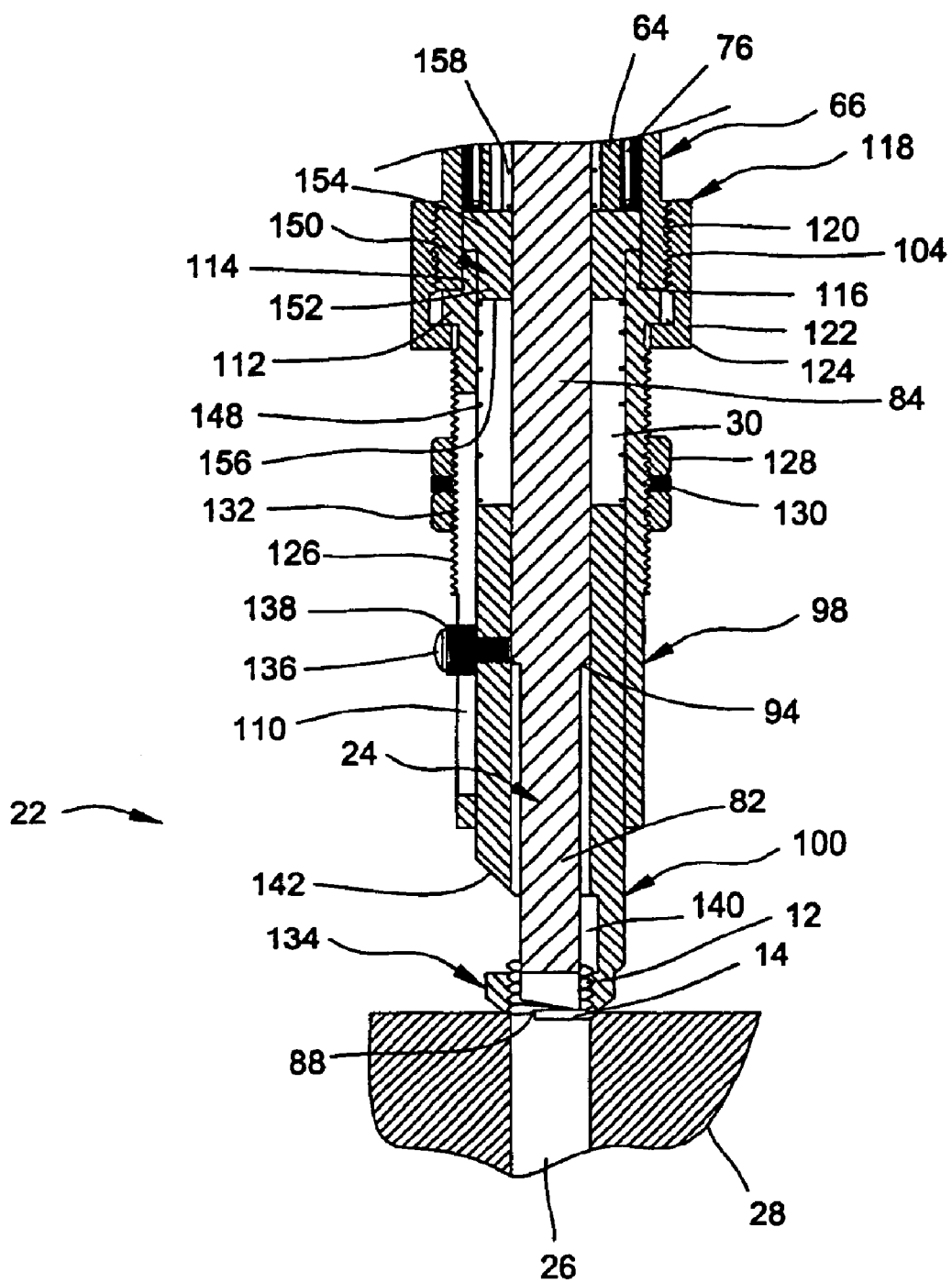
FIG. 4 is a partial sectional view of the mandrel of the power installation tool of FIGS. 1 and 2 pre-winding a helical coil insert prior to installation of the insert in a bore of a workpiece.

With reference to the drawings, a power installation tool 10 for installing helical coil inserts 12 having a tang 14 is shown. As shown best in FIG. 1, the power installation tool 10 according to the invention generally includes a gear housing 16 mounting an air cylinder 18, an air motor 20, and an adapter body 22. With reference to FIGS. 2, 3, and 4, a mandrel 24 for driving the helical coil insert 12 into a bore 26 of a workpiece 28 is received in a bore 30 extending axially through the entire length of the adapter body 22.

Figure 5:
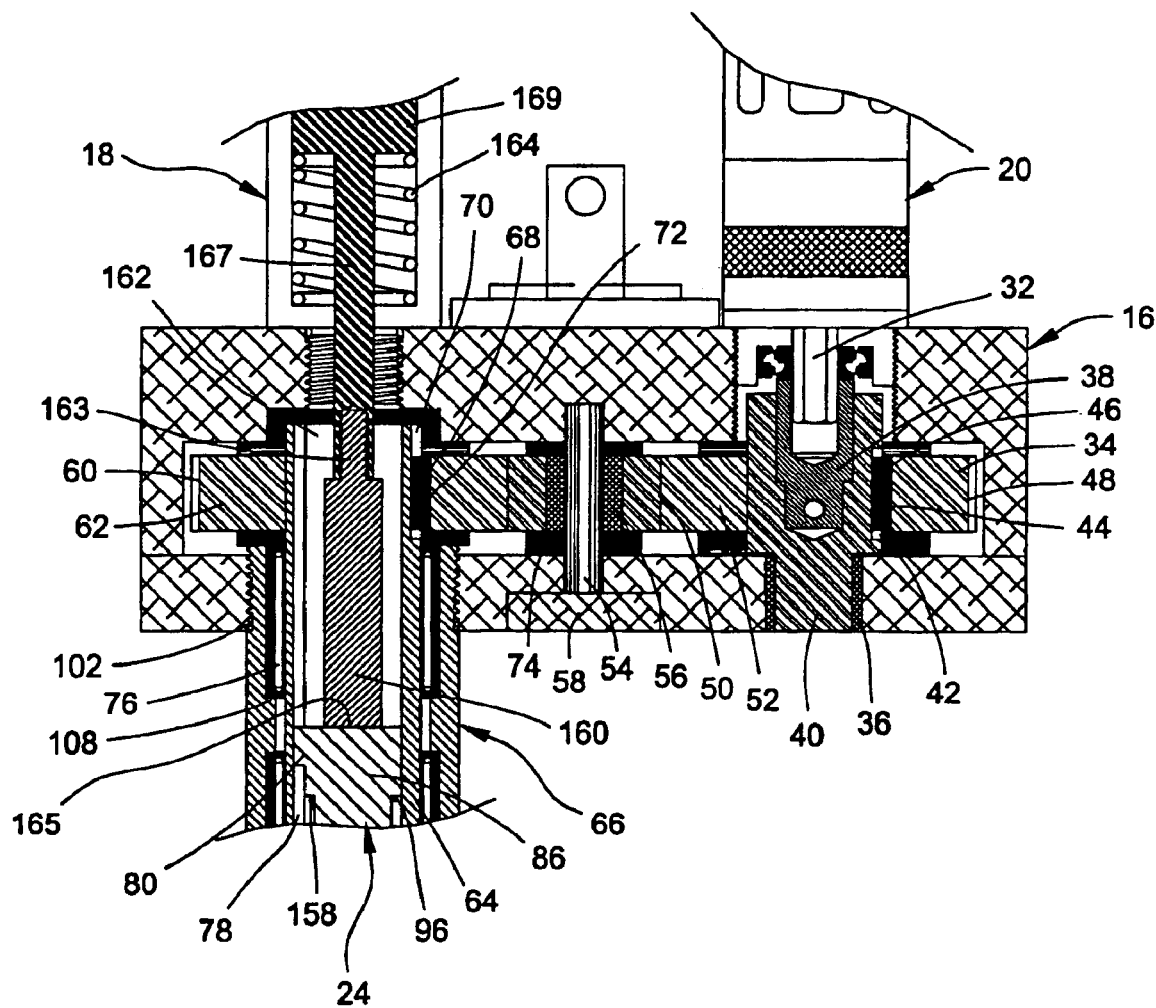
FIG. 5 is a partial sectional view of a gear train for driving a mandrel by a motor of the power installation tool of FIGS. 1 and 2.

The mandrel 24 is rotated within the adapter body 22 by the air motor 20 through an air motor shaft 32 and a gear train as best shown in FIG. 5. Because the air motor 20 is offset relative to the axial bore 30 of the adapter body 22, the gear train interconnects the shaft 32 and the mandrel 24. The gear train includes a drive gear 34 rotated directly by the shaft 32 of the motor 20 and supported by a bushing 36. More specifically, the shaft 32 rotates the spline 38 and the spline adaptor 40, which coaxially mount the drive gear 34. The spline adapter 40 includes an axially extending portion journalled in bushing 36 and a slot 42 aligned with a slot 44 on an inner diameter surface of gear 34. A key 46 disposed in the aligned slots 42, 44 fix the drive gear 34 for rotation with the spline adapter 40, and thus with the motor shaft 32. The drive gear 34 includes teeth 48 to drive teeth 50 of an intermediate gear 52, which is supported via a fixed axle 54. A bushing 56 surrounds the fixed axle 54, which is preferably press fit in the gear housing 16 and then secured by cover 58, and permits the gear 52 to freely rotate about the axle 54 while its gear teeth 50 mesh with teeth 48 of the drive gear 34 and teeth 60 of the drive sleeve gear 62, thereby transferring rotation from the drive gear 34 to the drive sleeve gear 62. More specifically, gear 62 drives a drive sleeve 64, which extends the length of the drive housing 66 of the adaptor 22. An inner diameter surface of gear 62 is fixed to rotate with the drive sleeve 64 through a key 68 registering aligned slots 70, 72 of the drive sleeve 64 and gear 62, respectively. Finally, gear washers 74 disposed coaxially on opposite sides of each gear 34, 52, 62 center the gear train in the gear housing 16 and ensure proper meshing of the gears 34, 52, 62.

With reference to FIGS. 2–4, the drive sleeve 64 is coaxially mounted for rotation within the drive housing 66 and extends nearly the length thereof. At each end of the drive sleeve 64, at an outer portion thereof, a needle bearing 76 spaces the drive sleeve 64 from the drive housing 66 and allows relative rotation thereof. Thus, when gear 62 rotates due to actuation of the air motor shaft 32, the drive sleeve 64 similarly rotates within the drive housing 66. The drive sleeve 64 also includes a longitudinal slot 78 formed along an interior surface for reception of a spline 80 of the mandrel 24, as shown best in FIGS. 2 and 5. In this way, rotation of the drive sleeve 64 causes rotation of the mandrel 24. Further, slot 78 permits the mandrel 24 to slide axially within the drive sleeve 64 while rotating as the mandrel 24 moves relative to the adapter body 22 for installation of the helical coil insert 12 and for removal of the tang 14 as will be discussed in more detail herein below.

Figure 6:
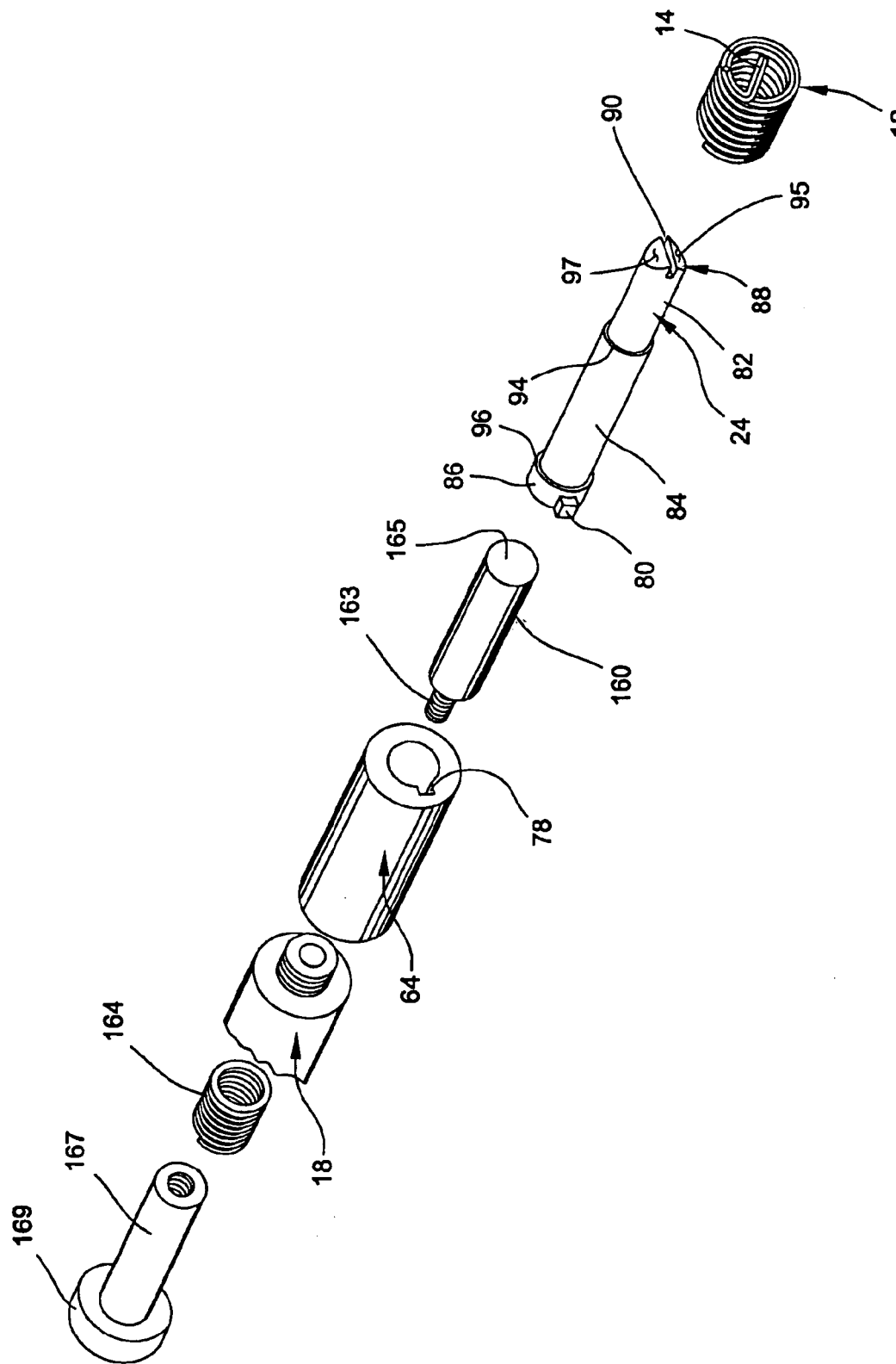
FIG. 6 is an exploded view of the mandrel, drive sleeve, and punch of the power installation tool of FIGS. 1 and 2.

As illustrated in FIGS. 2 and 6, the mandrel 24 extends generally the length of the adaptor body 22 through bore 30 and includes first, second, and third cylindrical sections 82,84,86. The first cylindrical section 82 includes a tip 88 for engaging the tang 14 of helical coil insert 12. The tip 88 includes a central recess 90 for engagement of the tang 14 having a width generally equivalent to the wire thickness of the particular helical coil insert 12 as best shown in FIG. 6. The central recess 90 engages the tang 14 for installation of the helical coil insert 12 and generally serves to prevent the tang 14 from rotating relative to the mandrel 24. Specifically, as the mandrel 24 is caused to rotate, the tang 14 is held in frictional engagement with the recess 90 and causes the helical coil insert 12 to rotate therewith.

The tip 88 includes a first and second ramped portion 92, 93 for use in breaking the tang 14 from the helical coil insert 12 after insertion of the helical coil insert 12 into a workpiece 28. The first ramped portion 92 includes a first surface 95 disposed in a general angular relationship to the longitudinal axis of the mandrel 24 while concurrently sloping down from a central axis of the mandrel 24 towards an outer diameter of the third cylindrical section 86. In this manner, the first surface 95 slopes from a high point W across the body of the mandrel 24 and along the recess 90 to a low point X. In addition, the first surface 95 slopes from a point Y disposed generally along the edge of the recess 90 to a point Z disposed on the outer diameter of the third cylindrical section 86, as best shown in FIG. 6.

The second ramped portion 93 includes a second surface 97 disposed at an angular relationship to the longitudinal axis of the mandrel 24 while concurrently sloping down from the central axis of the mandrel 24 generally towards the outer diameter of the third cylindrical section 86. In this manner, the first surface 95 slopes from a high point W' across the body of the mandrel 24 and along the recess 90 to a low point X'. In addition, the first surface 95 slopes from a point Y' disposed generally along the edge of the recess 90 to a point Z' disposed on the outer diameter of the third cylindrical section 86, as best shown in FIG. 6.

Figure 6A:
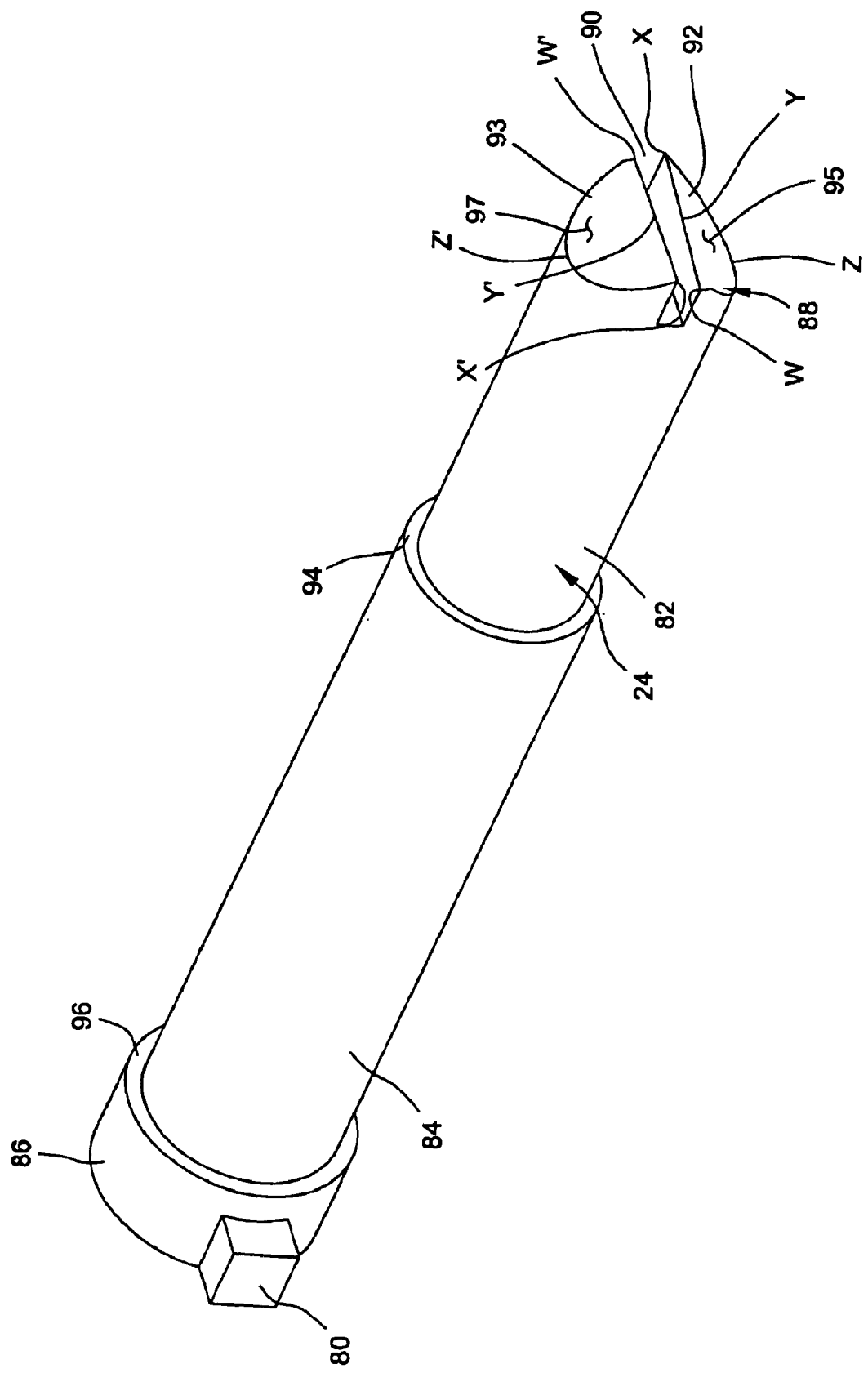
FIG. 6A is a more detailed view of the punch of FIG. 6.

The angular relationship of the second surface 97 to the longitudinal axis of the mandrel 24 is generally opposite to the angular relationship of the first surface 95 to the longitudinal axis of the mandrel 24. Specifically, the high point W of the first surface 95 is disposed across the recess 90 from the low point X' of the second surface 97 while the high point W' of the second surface 97 is disposed across the recess 90 from the low point X of the first surface 95, as best shown in FIG. 6A.

The second cylindrical section 84 is disposed adjacent the first cylindrical section 82 and includes a larger diameter than that of the first cylindrical section 82 such that the intersection of the first and second cylindrical sections 82,84 creates a first annular shoulder 94 as best shown in FIG. 3. The third cylindrical section 86 is disposed adjacent the second cylindrical section 84 and includes a larger diameter than that of the second cylindrical section 84. As such, the junction of the second and third cylindrical sections 84,86 creates a second annular shoulder 96. The third cylindrical section 86 further includes the spline 80 disposed generally opposite the second annular shoulder 96. Spline 80 provides for the mandrel 24 to rotate with the drive sleeve 64 relative to the housing 66 as will be discussed further below.

The adaptor body 22 includes the housing 66 coaxially aligned with a pre-winder sleeve 98 and a pre-winder 100. Bore 30 extends coaxially through all three portions. Housing 66 is a generally cylindrical member having bore 30 formed therethrough and includes a first series of threads 102 for attachment to the gear housing 16 and a second series of threads 104 to assist in fixedly attaching the housing 66 to the pre-winder sleeve 98. The housing 66 further includes a pair of recesses 108 on an inner surface of bore 30 for receiving the needle bearings 76 as best shown in FIG. 5. The needle bearings 76 assist in rotation of the drive sleeve 64 and ultimately the mandrel 24 relative to the housing 66.

The pre-winder sleeve 98 is a generally cylindrical member having bore 30 extending axially therethrough and includes a first end abutting the housing 66, a second end for slidably receiving the pre-winder 100, and a slot 110 disposed generally between the first and second ends. The first end of the pre-winder sleeve 98 includes an axial flange 112 and an extension 114, whereby the extension 114 is disposed generally at the base of the axial flange 112 and extends therefrom. In this manner, the intersection of the axial flange 112 and the extension 114 creates a recess 116 for receiving the housing 66. A pre-winder retainer 118 is provided and axially surrounds the housing 66 and the pre-winder sleeve 98 at their intersection to fixedly maintain the housing 66 in contact with the recess 116.

The pre-winder retainer 118 includes a series of threads 120 and an extension 122 generally defining a recess 124 as best shown in FIG. 2. The threads 120 matingly receive the threads 104 of the housing 66 while the recess 124 receives the axial extension 114 of the pre-winder sleeve 98. In this manner, as the threads 120 engage the threads 104 of the housing 66 and the recess 124 receives the extension 114 of the pre-winder sleeve 98, the housing 66 and pre-winder sleeve 98 are held in a fixed relationship.

The pre-winder sleeve 98 further includes a series of threads 126 for threadably receiving a stop 128. The stop 128 is a cylindrical collar having a series of threads 132 disposed on an inner surface for mating engagement with the threads 126 of the pre-winder sleeve 98. The stop 128 is axially adjustable relative to the pre-winder sleeve 98 by turning the stop 128 and allowing the threads 132 of the stop 128 to move relative to and on the threads 126 of the pre-winder sleeve 98. Specifically, as the stop 128 is caused to rotate relative to the pre-winder sleeve 98, the engagement of the threads 126,132 causes the stop 128 to axially move towards or away from the gear housing 16 depending on the direction of rotation. Once the desired position of the stop 128 is achieved, a stop washer 130 is provided to hold the stop 128 in the desired position relative to the pre-winder sleeve 98. Adjustment of the stop 128 relative to the pre-winder sleeve 98 sets the depth that the pre-winder 100 is permitted to axially travel within the pre-winder sleeve 98 as will be discussed herein below.

The pre-winder 100 is an elongate cylindrical member having bore 30 formed therethrough and includes a first end, a second end, and a foot portion 134. The first end of the pre-winder sleeve 100 is slidably received by the second end of the pre-winder sleeve 98 such that the pre-winder 100 is allowed to slide within the pre-winder sleeve 98. In addition, the first end of the pre-winder 100 includes a set screw 136 and an accompanying washer 138. The set screw 136 and washer 138 extend from an outer diameter of the pre-winder 100 through the slot 110 of the pre-winder sleeve 98. The set screw 136 and washer 138 are held in a fixed relationship to the pre-winder 100 and are permitted to slide relative to the pre-winder sleeve 98 in slot 110. In this manner, the pre-winder 100 is allowed to axially slide relative to the pre-winder sleeve 98 but relative rotation therebetween is restricted by the set screw 136 and washer 138 in slot 110.

Figure 7:
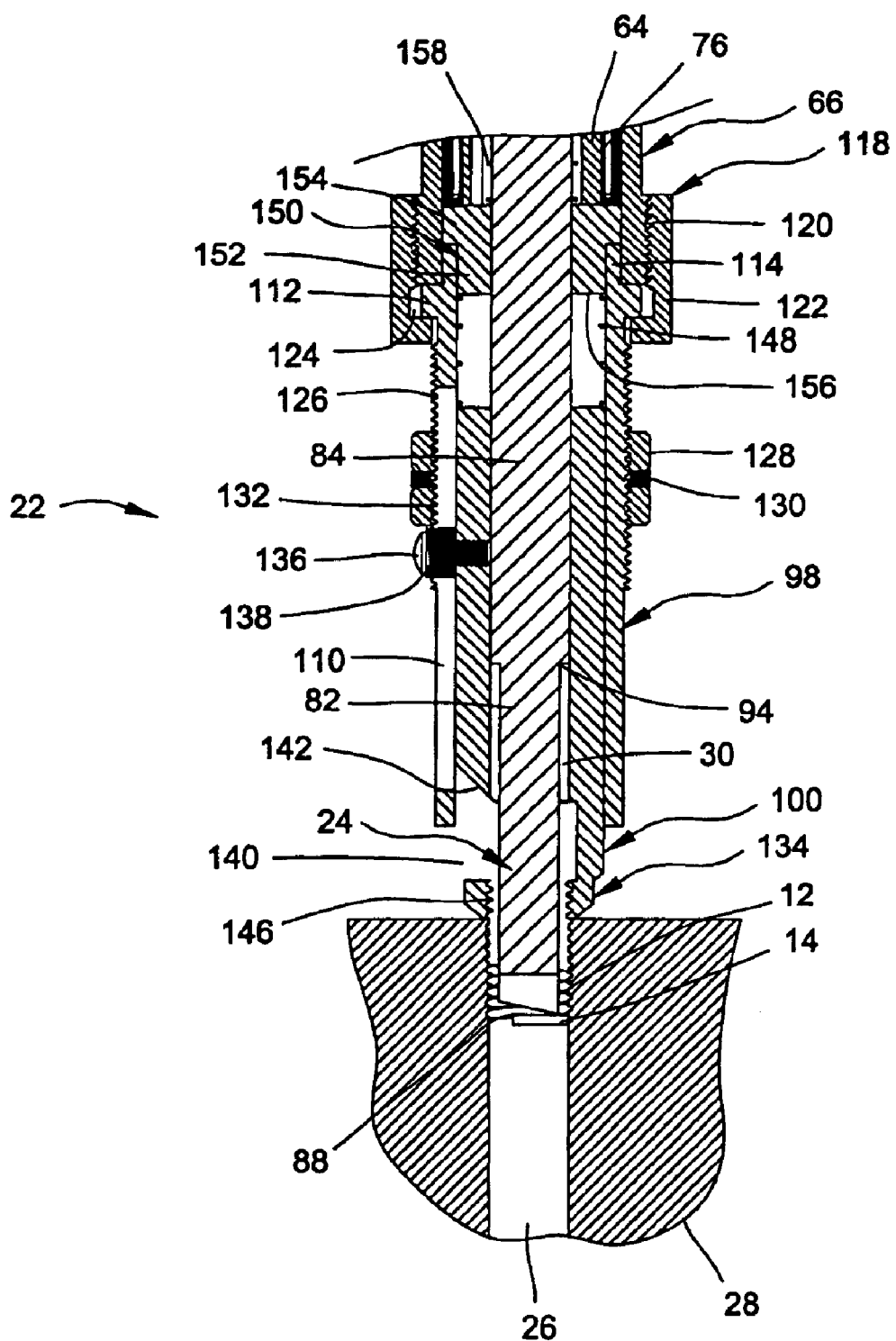
FIG. 7 is a partial sectional view of the mandrel of FIG. 6 driving the helical coil insert into the bore of the workpiece.

As best shown in FIGS. 4 and 7, the range of travel of the pre-winder 100 relative to the pre-winder sleeve 98 is governed by the placement of the stop 128. The range of axial movement of the pre-winder 100 is governed by the distance between the end of the slot 110 and the location of the stop 128 as best seen in FIG. 7. Specifically, the distance the set screw 136 is permitted to move within slot 110 between the end of slot 110 and stop 128 defines the amount the pre-winder 100 is permitted to axially slide within the pre-winder sleeve 98. As the stop 128 is moved toward the gear housing 16 the range of motion of the pre-winder 100 relative to the pre-winder sleeve 98 is increased. Conversely, as the stop 128 is rotated about the threads 126 of the pre-winder sleeve 98 away from the gear housing 16 the range of axial motion of the pre-winder 100 relative to the pre-winder sleeve 98 is reduced.

In one embodiment, the foot portion 134 reacts against a surface of the workpiece 28 causing the pre-winder 100 to slide within the pre-winder sleeve 98 towards the gear housing 16. As the pre-winder 100 travels closer to the gear housing 16, the mandrel 24 extends outwardly from the foot portion 134 and deeper into the bore 26 of the workpiece 28. The overall travel of the mandrel 24 through the foot portion 134 and into the workpiece 28 is governed by the amount the pre-winder 100 is permitted to slide relative to the pre-winder sleeve 98. The distance the mandrel 24 travels determines the depth that the helical coil insert 12 may be inserted into the workpiece 28. Adjustment of the stop 128 relative to the pre-winder sleeve 98 thus sets the depth that the mandrel 24 is permitted to travel into the bore 26 of the workpiece 28 and ultimately governs the placement of the helical coil insert 12.

The foot portion 134 includes bore 30 extending therethrough and a recess 140 for inserting a helical coil insert 12 therein. The foot portion 134 is disposed at a predetermined distance from the second end of the pre-winder 100, whereby the offset distance or recess 140 between the foot portion 134 and the second end of the pre-winder 100 is governed by the overall length of the helical coil insert 12 as best shown in FIG. 3. The second end of the pre-winder 100 further includes a tapered edge 142 for facilitating insertion of the helical coil insert 12 in the recess 140. With continued reference to FIG. 3, the foot portion 134 includes a reduced diameter bore 144 having threads 146 for engagement with the helical coil insert 12. In this manner, the diameter of the helical coil insert 12 is reduced as the helical coil insert 12 is caused to rotate through the reduced diameter bore 144. While the present invention discloses a reduced diameter bore 144 having threads 146 it should be understood that the reduced diameter bore 144 may be provided with other suitable means for constricting and securely holding the helical coil insert 12 and should be considered within the scope of the present invention.

As previously mentioned, the pre-winder 100 is received by the pre-winder sleeve 98 and permitted to slide relative thereto with the travel of the pre-winder 100 governed by the position of the set screw 136 in slot 110. In addition to the set screw 136, the movement of the pre-winder 100 is further influenced by a spring 148. Spring 148 is disposed between the first end of the pre-winder 100 and a spacer 150 as best shown in FIGS. 3 and 4. In this manner, the pre-winder 100 is biased in a first axial direction generally away from the gear housing 16. Specifically, as the pre-winder 100 is caused to axially move in a second axial direction generally towards to the gear housing 16, the spring 148 is compressed between the first end of the pre-winder 100 and the spacer 150, thereby biasing the pre-winder 100 in the first axial direction. The pre-winder 100 is caused to axially travel along bore 30 in the second direction due to an external force applied to the foot portion 134 of the pre-winder 100. In one embodiment, the force applied to the foot portion 134 is due to the foot portion 134 contacting a surface of the workpiece 28 as will be discussed in more detail below.

The spacer 150 is disposed generally at the intersection of the housing 66 and the pre-winder sleeve 98 and includes a central cylindrical section 150 and an axial flange 154 having bore 30 extending through both central cylindrical section 152 and axial flange, 154. The central cylindrical section 152 provides a surface 156 against which the spring 148 reacts while the axial flange 154 receives extension 114 of the pre-winder sleeve 98 to prevent axial movement of the spacer 150 within bore 30 as best shown in FIG. 3. In one embodiment, the spacer 150 is removable to adjust the spacing between the spring 148 and the first end of the pre-winder 100.

As previously discussed, the mandrel 24 serves to rotate the helical coil insert 12 into a workpiece 28. In addition, the mandrel 24 further acts to break off the tang 14 on the helical coil insert 12 after sufficient insertion of the helical coil insert 12 into the bore 26 of the workpiece 28. In this manner, a punch 160 is provided and reacts against the third cylindrical section 86 of the mandrel 24 to cause the mandrel 24 to move in the first axial direction away from the gear housing 16. The punch 160 is disposed between the third cylindrical section 86 of the mandrel 24 and a port 162 of the air cylinder 18. The punch 160 is an elongate body extending through bore 30 of the adapter body 22 having a connector 163 at one end and a punch foot 165 at an opposite end. The connector 163 is preferably a threaded male connector for reception in a threaded female connector at one end of a shaft 167 extending into an air cylinder 18. The opposite end of the shaft 167 is coupled to a piston 169, which reciprocates under the force of air pressure within the air cylinder 18. The piston 169, and thus the punch 160, is biased to a retracted position by a compression spring 164 positioned coaxially about the shaft 167 between an end of the air cylinder 18 and the piston 169. The punch 160 is free to move outwardly from the third cylindrical section 86 of the mandrel 24 against the bias of the spring 164, which returns the punch 160 to its retracted position in the absence of the force of air pressure causing the piston 169 to compress the spring 164 within the air cylinder 18.

In one embodiment, the air cylinder 18 is remotely activated by an operator once the helical coil insert 12 has been fully installed into the workpiece 28. Specifically, once the helical coil insert 12 is fully installed in the workpiece 28, an operator activates the air cylinder 18 causing a rush of air to react against the piston 169 causing the piston 169 to reciprocate and move against the bias of spring 164. Sufficient movement of the piston 169 in the first direction causes the shaft 167 to move in the first direction away from the gear housing 16 and cause the punch 160 to contact the third section 86 of the mandrel 24. Due to the force exerted by the punch 160, the mandrel 24 rapidly accelerates in the first axial direction causing the tip 88 to sever the tang 14 from the helical coil insert 12.

In another embodiment, the air cylinder 18 is automatically activated once the pre-winder 100 has fully traveled to a point where the set screw 136 has contacted the stop 128 and begins to move in the first direction under the bias of spring 148. In this manner, as the pre-winder 100 begins to move in the first axial direction away from the gear housing 16, the air cylinder 18 is activated by a sensor (not shown) disposed on the stop 128. Specifically, once the set screw 136 of the pre-winder 100 contacts the stop 128, the sensor is activated and sends a signal to actuate the air cylinder 18 once the set screw 136 disengages the stop 128. While a sensor is disclosed it should be understood that any method of communication between the pre-winder 100 and the air cylinder 18 such as an electro-mechanical relationship is anticipated and should be considered within the scope of the present invention.

In either embodiment, the mandrel 24 includes a spring 158 disposed adjacent to the axial flange 154 of the spacer 150 and the second annular shoulder 96 of the mandrel 24 to bias the mandrel 24 in the second axial direction or towards the gear housing 16 to return the mandrel 24 to a retracted position once the tang 14 is severed from the coil 12. Specifically, when the punch 160 contacts the mandrel 24 and causes the mandrel 24 to move in the first direction the spring 158 is compressed and thus acts to bias the mandrel 24 in the second axial direction once pressure in the air cylinder 18 is released and the tang 14 is properly severed from the coil 12. Return of the mandrel 24 to the retracted position enables another helical coil insert 12 to be inserted into the recess 140 of the adaptor body 22 and subsequently into a another bore 26 of workpiece 28.

Figure 8:
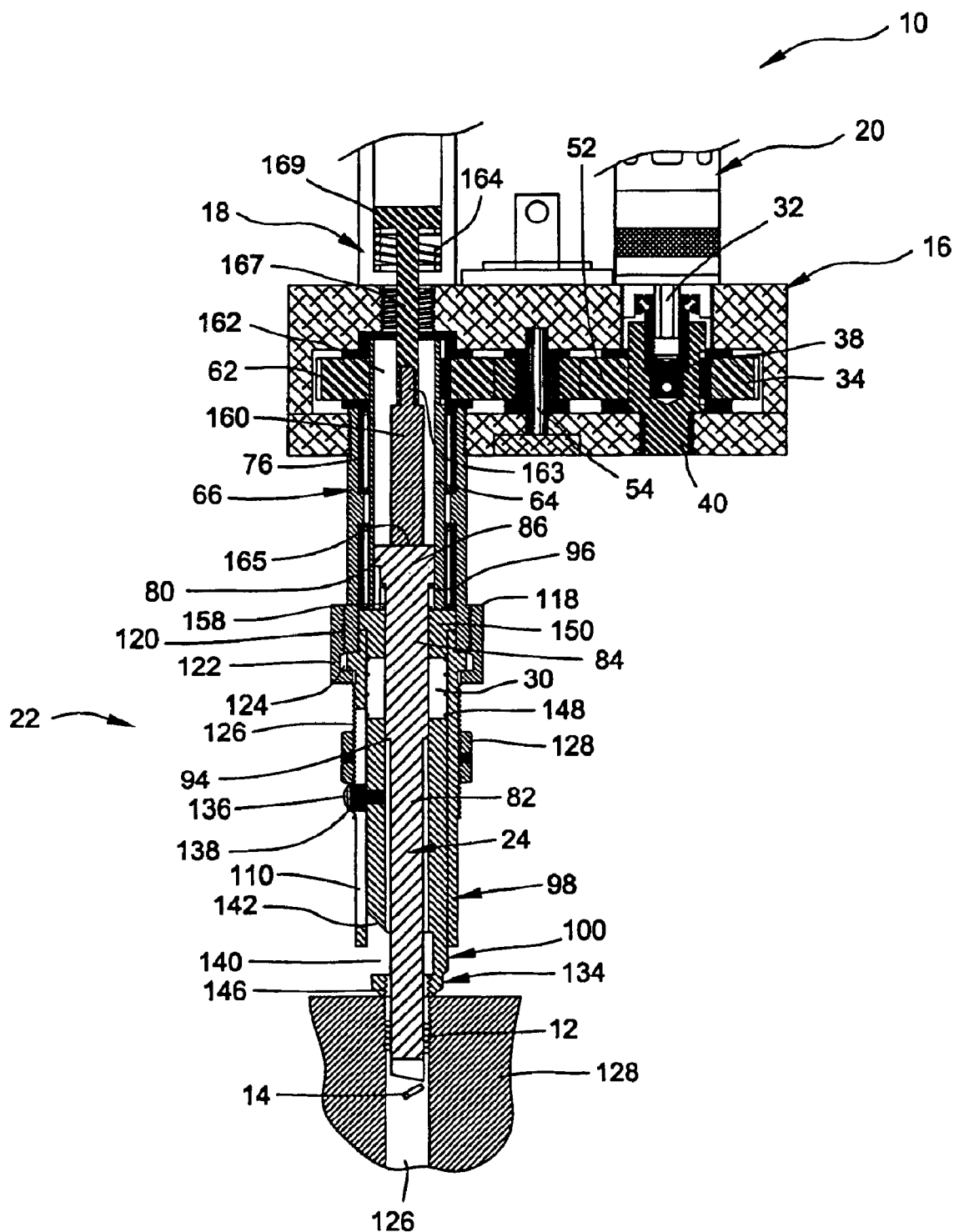
FIG. 8 is a partial sectional view of the power installation tool with the mandrel extended to remove a tang of the helical coil insert.

With particular reference to FIGS. 2, 7, and 8 the operation of the power installation tool 10 will be described in detail. In use, helical coil insert 12 is placed in recess 140, and aligned with bore 30 in adapter body 22. To accommodate loading of the helical coil insert 12, the pre-winder 100 is fully extended in the first direction due to the bias of spring 148 as shown in FIG. 3 such that the mandrel 24 does not extend into recess 140. To begin the installation of the helical coil insert 12, the installer places the power installation tool 10 against the workpiece 28 such that the bore 30 is coaxially aligned with the bore 26 of the workpiece 28.

Once the power installation tool 10 is properly aligned with the bore 26 of the workpiece 28, the installer applies a force to the power installation tool 10 and concurrently actuates an air motor 20 to cause rotation of drive sleeve 64 through interconnection of gears 34, 52, 62 and shaft 32 of air motor 20, as explained above. Drive sleeve 64 rotates mandrel 24 through connection of mandrel spline 80 in drive sleeve slot 78. The tip 88 of mandrel 24 rotates in bore 30 while the pre-winder 100 abuts the workpiece 28. When sufficient force is applied to the power installation tool 10, the workpiece 28 will exert a reaction force on the pre-winder 100 causing the pre-winder 100 to slide within the pre-winder sleeve 98 in the opposite (second) direction. Once the pre-winder 100 has traveled sufficiently in the opposite direction against the bias of spring 148, the tip 88 engages the helical coil insert 12 in recess 140. Specifically, the tip 88 slides through helical coil insert 26 until the central recess 90 grabs tang 14 to rotate helical coil insert 12. Mandrel 24 then rotates insert 12 into reduced diameter bore 144 to pre-wind insert 12 by contracting insert 12 through engagement of threads 146 of the reduced diameter bore 144, as best shown in FIG. 4.

Continued advancement of pre-winder sleeve 98 in the second direction further compresses spring 148 and causes pre-wound insert 12 to pass from reduced diameter bore 144 and into bore 26 of workpiece 28. The pre-winder 100 will continue to advance until the set screw 136 contacts the stop 128 on the per-winder sleeve 98 as previously discussed and as shown in FIG. 7.

Once the helical coil insert 12 reaches the desired depth within the bore 26 of the workpiece 28, the air cylinder 18 is activated by either an external operation or an automatic control as previously discussed. In either case, once the air cylinder 18 is activated, a rush of air from the air cylinder 18 causes the piston 169 to move in the first direction against the bias of spring 164. Sufficient movement of the piston 169 in the first direction causes the shaft 167, and subsequently the punch 160, to contact the mandrel 24. Movement of the punch 160 concurrently causes the mandrel 24 to slide in the first direction against the bias of spring 164 and axially slide within bore 30 due to the interaction of the punch foot 165 and the third cylindrical section 86 of the mandrel 24.

Sufficient movement of the mandrel 24 in the first direction causes the ramped portion 92 of the tip 88 to sever the tang 14 from the helical coil insert 12. Once the tang 14 is properly severed from the helical coil insert 12, the mandrel 24 is caused to move in the second direction due to the bias imparted by spring 158 and back to its retracted position while the punch similarly moves in the second direction due to the bias of spring 164 on the piston 169. At this point, the force exerted on the power installation tool 10 can be released, thereby allowing the pre-winder 100 to move in the first axial direction and back to a position whereat another helical coil insert 12 may be placed in recess 140.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tool for installing a helical coil insert having a tang in a tapped hole formed in a workpiece, said tool comprising:
    a tubular body including a bore extending along its axis, said bore adapted to accommodate a helical coil insert;
    a mandrel coaxially disposed in said bore of said tubular body and axially movable in said bore of said tubular body between a first and second position, said mandrel including a leading end for drivingly engaging said tang of said helical coil insert;
    a motor for rotating said mandrel in said tubular body; and
    an air cylinder for applying an axial force to said mandrel to move said mandrel from said first position to said second position.

2. The tool according to claim 1, further comprising a pre-winder coaxially disposed in said bore of said tubular body, said pre-winder axially surrounding said mandrel and moveable relative thereto.

3. The tool according to claim 2, wherein said pre-winder includes a reduced diameter bore at a foot of said pre-winder for contracting the helical coil insert prior to installation of the helical coil in the workpiece.

4. The tool according to claim 3, wherein said reduced diameter bore of said foot is threaded.

5. The tool according to claim 2, further comprising a stop to limit axial movement of said pre-winder.

6. The tool according to claim 5, wherein said pre-winder further includes a set screw for interaction with said stop.

7. The tool according to claim 5, wherein said stop is threadably received by said tubular body, thereby allowing for axial adjustment of said stop relative to said tubular body.

8. The tool according to claim 1, wherein said tubular body receives a spacer aligned coaxially with said bore of said tubular body to limit axial movement of a pre-winder sleeve in said bore of said tubular body.

9. The tool according to claim 8, wherein said sleeve limits axial movement of said mandrel and establishes said second position of said mandrel.

10. The tool according to claim 1, further including a pre-winder coaxially disposed in said bore of said tubular body, said pre-winder including an opening at one end for positioning the helical coil insert in alignment with said bore of said tubular body.

11. A method comprising:
    positioning a helical coil insert in alignment with a bore extending along an axis of a tubular body;
    rotating a mandrel coaxially disposed in said bore of said tubular body, selectively engaging said mandrel with said helical coil;
    rotating said helical coil through engagement with said mandrel;
    rotating said helical coil into a tapped hole of a workpiece by rotation of said mandrel; and
    driving said mandrel from a retracted position within said tubular body to an extended position to sever a tang from said helical coil insert.

12. The method of claim 11, further comprising the step of pre-winding said helical coil insert in said reduced diameter bore of said tubular body for contracting said helical coil insert about a leading end of said mandrel.

13. The method of claim 12, further comprising the step of providing said reduced diameter bore with threads for mating engagement with said helical coil insert.

14. The method of claim 11, further comprising a step of engaging a recess on a leading end of said mandrel with said tang of said helical coil insert for installing said helical coil insert at said selected depth in said tapped hole of said workpiece.

15. The method of claim 11, further comprising a step of providing said mandrel with a cutting means for severing said tang from said insert.

16. The method of claim 15, wherein said cutting means is disposed at a leading end of said mandrel.

17. The method of claim 11, further comprising the step of rotating said mandrel such that said helical coil engages a reduced diameter bore disposed along said axis of said tubular body.

18. The method of claim 11, further comprising the step of applying a force to said tubular body such that said helical coil insert is rotated into said tapped hole of said workpiece.

19. A tool for installing a helical coil insert having a tang in a tapped hole formed in a workpiece, said tool comprising:
    a tubular body including a bore extending along its axis;
    a mandrel coaxially disposed in said bore of said tubular body and axially movable in said bore of said tubular body between a first and second position, said mandrel including a leading end for drivingly engaging the tang of the helical coil insert;
    a motor for rotating said mandrel in said tubular body, said motor axially offset from said tubular body and including a gear train interconnecting said mandrel and a shaft of said motor; and
    an air cylinder for applying an axial force to said mandrel to move said mandrel from said first position to said second position.

20. The tool according to claim 19, further comprising a drive sleeve interconnecting said gear train to said mandrel.

21. The tool according to claim 20, further comprising a piston in said air cylinder and a punch connecting said piston to said mandrel, whereby axial movement of said piston in said air cylinder forces said mandrel from said first position to said second position.

22. The tool according to claim 21, wherein said punch is adapted to slide axially in said drive sleeve under force of air from said air cylinder, said punch movable from a retracted position adjacent an outlet port of said air cylinder to a deployed position forcing said mandrel into said second position.

23. The tool according to claim 19, further including a pre-winder coaxially disposed in said bore of said tubular body, said pre-winder including an opening at one end for positioning the helical coil insert in alignment with said bore of said tubular body.

24. A tool for installing a helical coil insert having a tang in a tapped hole formed in a workpiece, said tool comprising:
    a tubular body including a bore extending along its axis;
    a mandrel coaxially disposed in said bore of said tubular body and axially movable in said bore of said tubular body between a first and second position, said mandrel including a leading end for drivingly engaging the tang of the helical coil insert;

a motor for rotating said mandrel in said tubular body; and an air cylinder for applying an axial force to said mandrel to move said mandrel from said first position to said second position;

wherein said mandrel is operable to sever the tang from the helical coil insert after insertion of the helical coil insert into the workpiece.

25. The tool according to claim 24, further comprising a pre-winder coaxially disposed in said bore of said tubular body, said pre-winder axially surrounding said mandrel and moveable relative thereto.

26. The tool according to claim 25, wherein said pre-winder includes a reduced diameter bore at a foot of said pre-winder for contracting the helical coil insert prior to installation of the helical coil in the workpiece.

27. The tool according to claim 26, wherein said reduced diameter bore of said foot is threaded.

28. The tool according to claim 25, further comprising a stop to limit axial movement of said pre-winder.

29. The tool according to claim 28, wherein said pre-winder further includes a set screw for interaction with said stop.

30. The tool according to claim 28, wherein said stop is threadably received by said tubular body, thereby allowing for axial adjustment of said stop relative to said tubular body.

31. The tool according to claim 24, wherein said tubular body receives a spacer aligned coaxially with said bore of said tubular body to limit axial movement of a pre-winder sleeve in said bore of said tubular body.

32. The tool according to claim 31, wherein said sleeve limits axial movement of said mandrel and establishes said second position of said mandrel.

33. The tool according to claim 24, further including a pre-winder coaxially disposed in said bore of said tubular body, said pre-winder including an opening at one end for positioning the helical coil insert in alignment with said bore of said tubular body.

* * * * *